Patented Apr. 19, 1949

2,467,774

UNITED STATES PATENT OFFICE 2,467,774

PROCESS OF HYDROLYZING VINYL ESTER POLYMERS

Louis Plambeck, Jr., Wilmington, Del., assignor to E. I. du Pont de Nemours & Company, Wilmington, Del., a corporation of Delaware No Drawing. Application February 16, 1945, Serial No. 578,345

4 Claims. (Cl. 260—86)

This invention relates to hydrolyzed vinyl polymers and, more particularly, to a new process for obtaining them.

In industrial practice, high molecular weight polymers of vinyl esters, including interpolymers of a vinyl ester with another polymerizable compound, are had most efficiently and in best yields by the emulsion method. According to one modification of said method a monomeric ester of an organic acid either alone or in admixture with at least one polymerizable unsaturated compound is emulsified in an aqueous emulsion having a pH within the range of 5 to 8, said emulsion containing a dissolved salt of perdisulfuric acid and an acid-stable dispersing agent comprising an acyclic hydrocarbon of from 12 to 18 carbon atoms substituted with one and only one nitrogen-free anionic solubilizing group, and then polymerizing said polymerizable materials while in said emulsion, the process being carried out in a vessel containing a substantially oxygen free gas space.

While emulsion polymerization of vinyl organic esters is preferred on account of the superior homopolymers and interpolymers thereby obtained, the process of working up said polymers to obtain a dry product in a form suitable for hydrolysis by the conventional solution method is quite troublesome. Usually the dispersed polymeric material is treated with an electrolyte to coagulate the polymer, which is then washed and dried. Since polymerized vinyl organic esters, e. g., polyvinyl acetate, soften at relatively low temperatures and are rather water sensitive, it is sometimes difficult to remove all the soluble salts and dry the product without obtaining large lumps which are difficult to dissolve. Moreover, certain vinyl interpolymers, e. g., interpolymers of ethylene with vinyl acetate, soften at such a low temperature that it is necessary to use a rubber mill with corrugated rolls to wash the soluble materials out of the coagulated latex.

Once the aforementioned homopolymers and interpolymers are obtained in the dry state, the polymer is, according to prior art hydrolyzing practice, dissolved in methanol and the resultant solution is heated with either acid or alkali to form methyl acetate and the hydrolyzed homopolymer or interpolymer which, after filtration, washing and drying, is obtained as a fine powder. Inasmuch as the polymers desirable for most applications are of relatively high molecular weight, the alcohol solutions of the vinyl ester polymers are viscous and difficult to handle even if relatively dilute. Moreover, many of the vinyl interpolymers as, for example, certain of the vinyl acetate/ethylene interpolymers, are insoluble in alcohols alone so that solvent mixtures containing large amounts of aromatic hydrocarbons must be employed.

This invention has as an object the provision of a new process for hydrolyzing certain vinyl polymers. A further object is a process for hydrolyzing polymerized vinyl esters and certain vinyl interpolymers cheaply and in a practical manner. A still further object is the provision of a hydrolysis process whereby the hydrolyzed product is obtained directly, without isolation of the polymer, from the dispersions of polymerized vinyl esters and interpolymers of vinyl esters with other polymerizable compounds had according to emulsion polymerization processes. Additional objects will become apparent from an examination of the following description and claims.

These and other objects and advantages are accomplished according to the herein described invention which broadly comprises substantially completely hydrolyzing a polymerized vinyl ester of a monocarboxylic acid, or an interpolymer of said ester with another polymerizable compound free from salt-forming groups, in the form of an aqueous dispersion, by mixing therewith the theoretically required quantity of a strong base, in such a manner that agglomeration of the polymer is avoided, allowing hydrolysis to proceed to completion, and thereafter isolating the hydrolyzed product.

In a more restricted embodiment, this invention comprises admixing an aqueous dispersion of a vinyl polymer with a strong base in an amount substantially equal to that theoretically required to react with the ester groups of the polymer, said vinyl polymer being selected from the group consisting of homopolymers of vinyl esters of monocarboxylic acids having the general formula RCOOH, wherein R is of the group consisting of hydrogen atoms and hydrocarbon radicals, said acid being free from unsaturated linkages between acyclic carbon atoms and any carbon atom alpha to the carbon atom in the carboxyl group of said acid being attached to at least one but not more than three carbon atoms, and interpolymers of said vinyl esters with another polymerizable compound which contains at least one ethylenic linkage and is free from salt-forming groups, said admixing being effected at a temperature within the range of from 0° C. to 20° C., said dispersion containing not more than 60% solids by weight, thereafter heating the resultant mixture to a temperature of not more than 100° C. until hydrolysis is substantially complete, precipitating the hydrolyzed product from solution, washing and drying.

One preferred embodiment of this invention comprises cooling to from 5° C. to 10° C. an aqueous dispersion containing from 15% to 30% by weight of polymerized vinyl acetate, mixing therewith a methanol-water solution of the theoretically required quantity of sodium hydroxide at a temperature within the range from 5° C. to 10° C. and heating the resultant mixture at a temperature within the range of from 80° C. to 85° C. until a clear solution is obtained. This solution is neutralized, filtered and the resultant hydrolyzed product is precipitated by the slow addition, with stirring, of enough sodium chloride to saturate the solution. The product is filtered off, washed with water until free from salts, and dried.

Another preferred embodiment of this invention comprises cooling to from 5° C. to 10° C. an aqueous dispersion containing from 15% to 30% by weight of an interpolymer of vinyl acetate and ethylene in which the mol ratio of vinyl acetate to ethylene is greater than 2/1, mixing therewith a methanol-water solution of the theoretically required quantity of sodium hydroxide at a temperature within the range from 5° C. to 10° C. and heating the resultant mixture at a temperature within the range of from 80° C. to 85° C. until a clear solution is obtained. This solution is neutralized, filtered and the resultant hydrolyzed product is precipitated by the slow addition, with stirring, of enough sodium chloride to saturate the solution. The product is filtered off, washed with water until free from salts, and dried.

By the expression "polymerizable compound which contains at least one ethylenic linkage and is free from salt-forming groups," as used herein and in the appended claims is meant an organic compound, free from functional groups convertible to salts on hydrolysis, which contains at least one -C=C- double bond which is not present in a benzene nucleus, i. e., at least one ethylenic double bond, said compound having the property of polymerizing to yield macromolecular organic compounds containing a plurality of recurring units which are joined together in a chain-like manner, i. e., products having a degree of polymerization greater than a trimer.

By the term "strong base" as employed herein and in the appended claims is meant a compound which yields hydroxyl ions in aqueous solution and has a basic dissociation constant greater than $1 \times 10^{-5}$.

The following examples, in which proportions are in parts by weight unless otherwise specified, are given for illustrative purposes and are not intended to place any restrictions on the herein described invention.

*Example I*

A vinyl acetate/ethylene interpolymer in which the mol ratio of vinyl acetate to ethylene is approximately 15 to 1 is prepared by the emulsion polymerization of vinyl acetate under 60–100 lbs./sq. in. ethylene pressure by the following procedure:

An aqueous phase (pH 6.4) consisting of 5400 parts of distilled water, 16 parts of ammonium persulfate, 17.5 parts of sodium dihydrogen phosphate monohydrate, 20 parts of commercial sodium lauryl-sulfate, and 2 parts of sodium hydroxide is charged into a stainless steel autoclave together with 1800 parts of freshly distilled vinyl acetate. The autoclave free space is purged of air by repeatedly pressuring to 100 lbs./sq. in. with ethylene and releasing the pressure. Stirring is then started and the autoclave charge is heated to 60° C. and held at this temperature for 8 hours under an ethylene pressure of 60–100 lbs./sq. in. It is necessary to add ethylene from time to time to maintain the pressure in this range. After completion of the polymerization, the charge is cooled and removed from the autoclave.

In a glass-lined, steam jacketed vessel fitted with a mechanical stirrer are placed 1853 parts of the above interpolymer dispersion (containing 384 parts of interpolymer) and 750 parts of cracked ice, which is sufficient to cool the mixture to 10° C. or lower. To the cold dispersion there is added with vigorous stirring a cold (0° C.) solution of 353 parts of U. S. P. potassium hydroxide in 2000 parts of water and cracked ice. The alkali causes the dispersion to coagulate immediately but because of the low temperature and vigorous stirring the coagulated particles do not agglomerate. Steam is turned into the kettle jacket and the mixture heated slowly with continuous stirring to 50° C. and then heated more rapidly to 80–85° C. and maintained at this temperature for one hour. When the stirrer is stopped the hydrolyzed polymer settles out as gummy mass which is washed with several portions of water to remove most of the excess alkali and other salts. The washed product is dissolved by the aid of heat in 3700 parts of water and 300 parts of methanol. This solution is neutralized with hydrochloric acid, filtered to remove any extraneous matter, diluted to 6000 parts with water, and the polymer precipitated by the slow addition of 10,000 parts of acetone to the stirred solution. The polymer is filtered, washed first with water and then with acetone. After drying, 115 parts of hydrolyzed polymer are obtained. By analysis the saponification number of this material is found to be 9.7 indicating that hydrolysis is 99.2% complete. However, infrared absorption measurements show complete absence of ester groups indicating hydrolysis to be complete. A 10% solution of the hydrolyzed polymer in water-ethanol (8–1) has a bubble tube viscosity of 63 poises.

*Example II*

An ethylene/vinyl acetate interpolymer dispersion is prepared as in Example I except that an ethylene pressure of 45 lbs./sq. in. is maintained during the polymerization. Under these conditions there is obtained an interpolymer containing about 1.5–2% of ethylene.

In a glass-lined, steam jacketed kettle fitted with a mechanical stirrer are placed 500 parts of this dispersion (23% solids) and 200 parts of cracked ice. To the cold (10° C.) dispersion there is added slowly with vigorous stirring a cold (10° C.) solution of 59 parts of technical grade flake sodium hydroxide, 160 parts of methanol and 200 parts of water and ice. The mixture is stirred in the cold for a few minutes and then heated to 80–85° C. over 20–25 minutes. In this time hydrolysis is complete and a clear viscous solution is obtained. This is diluted to 2000 parts with water, filtered to remove any extraneous material, neutralized with hydrochloric acid and cooled to 20–25° C. With vigorous stirring, enough solid sodium chloride is added to saturate the solution, whereupon the hydrolyzed product is precipitated out as coarse granules which are easily filtered off. The polymer is washed with water on the filter until free of salt, given a final wash with acetone and then dried in a vacuum oven at 60° C. The dry product, 53 parts, represents a yield of over 90%. A 10% solution of the polymer in water-ethanol (8–1) has a viscosity of 33 poises. Films cast from solutions of the product have tensile strengths over 5000 lbs./sq. in. after soaking in water at 25° C. for 24 hours.

*Example III*

A reaction mixture is prepared by dissolving 3 parts of commercial sodium lauryl sulfate, 3 parts of ammonium persulfate, and 3 parts of sodium dihydrogen phosphate monohydrate in 900 parts of water and adding sodium hydroxide solution thereto in amount sufficient to provide pH of 6.4. The resultant solution, together with 300 parts of vinyl acetate, is placed in a pressure vessel, the free space of which is swept with nitrogen to remove air, and the vessel is closed. The mixture is agitated by rocking the vessel and is heated at 40° C. for 15 hours. A quantitative yield of polyvinyl acetate is obtained.

To 735 parts of the polyvinyl acetate dispersion prepared as above (25% solids), there is added sufficient cracked ice to cool the dispersion to 5° C. To this cold dispersion there is added a cold (5° C.) solution of 86 parts of sodium hydroxide, 240 parts of methanol, and 300 parts of water and cracked ice. On mixing the two liquids, the polymer coagulates to a soft, thick mass but continued stirring in the cold causes it to thin out so that it appears no thicker than the original dispersion. At this stage heating is begun and over 20–25 minutes the mixture is heated to 85–90° C. and maintained at this temperature for about 10 minutes until a clear solution is obtained. The pH of the solution is adjusted from 10.5 to 6 by the addition of acetic acid, the solution is filtered, and sufficient solid sodium chloride added to saturate the solution. This treatment causes the hydrolyzed product to separate out in coarse granules which are washed with water to remove salt and then dried. The dry product, 80 parts, represents an 85% yield. A 10% solution of this polyvinyl alcohol in water-ethanol (8–1) has a bubble tube viscosity greater than 150 poises compared to 35 poises for a like solution of a commercial high viscosity polyvinyl alcohol.

One of the chief advantages of the dispersion hydrolysis procedure of this invention can be brought out by consideration of a conventional solution methanolysis with respect to the polyvinyl acetate used in this example. In the usual practice, methanol solutions containing 20–35% polyvinyl acetate are treated with an alkali or acid hydrolysis catalyst. The usual "high viscosity" polyvinyl acetates used in such procedures have a solution viscosity (5% in chloroform at 25° C.) of 3–4 poises, while the polyvinyl acetate prepared in emulsion and used in the above described dispersion hydrolysis procedure has a viscosity of 75 poises (5% in chloroform at 25° C.). It is evident that the solids content of a solution of such a polymer would have to be much less than 20% if the solution is to be handled by the same mixing equipment used for the conventional polymer. A dispersion containing 25% solids, however, is hardly more viscous than pure water.

*Example IV*

Eight hundred eighty parts of polyvinyl acetate dispersion prepared as in Example III above and containing 24.7% solids is cooled to 5° C. by the addition of 250 parts of cracked ice and water. To this dispersion there is added with rapid stirring a cold (5° C.) solution of 105 parts of sodium hydroxide, 240 parts of methanol, and 500 parts of cracked ice and water. This mixture is stirred until the original soft coagulum has been redispersed and then allowed to stand at 20–25° C. for 15 hours with no further stirring. The mixture is then found to have set to a weak, opaque white gel (pH 10.8). This is broken up by stirring and allowed to stand an additional 8 hours when, since a test shows hydrolysis to be incomplete, 10 parts of sodium hydroxide is added and the mixture allowed to stand another 16 hours. A test portion at this stage shows hydrolysis to be complete. The gel particles are washed with water until free from salts and dried. The hard, dense product obtained in 80% yield is similar to physical properties to the polyvinyl alcohol prepared in Example III, but, in addition, is distinguished by the water-white characteristics of films cast from solution. Even when the edges of thick films are examined, there is no tinge of yellow visible to the eye. Such films are especially suitable for optical uses such as color filters, polarizing layers, etc.

*Example V*

An ethylene/vinyl acetate interpolymer dispersion is prepared as in Example I except that the ethylene pressure used is 500–510 lbs./sq. in. The resulting interpolymer is found to contain 12–13% of ethylene and is insoluble in methanol. A 5% solution in chloroform has a viscosity of 100 poises at 25° C.

In a glass-lined, steam-jacketed vessel are placed 1000 parts of this dispersion (26.7% solids) and sufficient cracked ice to cool the mixture to 5° C. With the aid of a mechanical stirrer, a cold (5° C.) solution of 125 parts of technical sodium hydroxide, 480 parts of methanol, and 250 parts of water and ice is mixed with the cold latex. Stirring is continued for 10–15 minutes and the mixture then heated to 80–85° C. and held at this temperature for 30 minutes. During this time the saponification of the vinyl ester takes place but the resulting hydrolyzed interpolymer does not go into solution. Without stopping the stirrer the mixture is brought to a pH of 7 by the addition of hydrochloric acid and then cooled to room temperature. The hydrolysis product is filtered off, washed thoroughly with water, and dried to give a dense, white powder. The dry product, 153 parts, represents nearly a quantitative yield. The hydrolyzed polymer is insoluble in boiling water but does dissolve in a hot aqueous mixture containing at least 50% of methanol or dioxane. Thin films of the product increase in length less than 3% after soaking in water at 30° C. for 30 minutes.

In contrast to the above procedure, a potassium hydroxide catalyzed methanolysis carried out with 267 parts of dry ethylene/vinyl acetate interpolymer from the same polymerization run (equivalent to the 1000 parts of the dispersion used above) requires 4700 parts of a mixture of methanol and benzene to obtain a solution which can be handled by the same mixing equipment as used for the dispersion hydrolysis.

*Example VI*

An ethylene/vinyl acetate interpolymer dispersion is prepared as in Example I except that an ethylene pressure of 240–250 lbs./sq. in. is employed. The polymerization product contains 5–6% ethylene.

As described in Example V, 1000 parts of the above dispersion (24.4% solids) is cooled to 5° C. and treated with a cold (5° C.) solution of 116 parts of sodium hydroxide, 400 parts of methanol, 50 parts of sodium chloride, and 250 parts of water and ice. This mixture is heated to 80–85° C. and held at this temperature for five minutes when 500 parts of sodium chloride is added slowly. Heating at 80–85° C. is continued for 20–25 minutes after addition of the salt. The mixture is neutralized with hydrochloric acid, cooled to room temperature, the stirrer stopped, and the hydrolysis product separated by filtration, washed to remove salt, and dried. The dry product amounts to 127 parts or a yield of 95%. This product in the form of thin films swells 17% in water at 30° C. for 30 minutes, and has a tensile strength of 3200 lbs./sq. in. after soaking in water for 24 hours.

Addition of the salt to the hydrolysis mixture suppresses solution of the hydrolyzed interpolymer and allows the product to be isolated directly without an extra precipitation or coagulation step.

*Example VII*

A vinyl acetate/propylene interpolymer dispersion is prepared by substituting 300 parts of a 3.5% solution of propylene in vinyl acetate for the 300 parts of vinyl acetate used in Example III. The polymerization temperature is 50° C.

By the procedure outlined in Example III, 1284 parts of this interpolymer dispersion (17% solids) is treated with a solution of 107 parts of sodium hydroxide, 240 parts of methanol, and 300 parts of water. The hydrolysis product is salted out, washed with water and acetone, and then dried.

*Example VIII*

A vinyl fluoride/vinyl acetate interpolymer in which the mol ratio of vinyl acetate to vinyl fluoride is approximately 9/1 is prepared by the emulsion polymerization of vinyl acetate under 60–70 lbs./sq. in. vinyl fluoride pressure by essentially the procedure described in Example I. The polymerization requires 4 hours at 50°–55° C. In a stainless steel jacketed tank fitted with a high speed stirrer are placed 5129 parts of the interpolymer latex (25% polymer) and an equal amount of water. The diluted latex is cooled to 5° C. by the addition of cracked ice and 6400 parts of cold (5° C.) methanol is added with vigorous stirring. After a few minutes, 615 parts of flake sodium hydroxide is added and stirring continued in the cold for 10 minutes. The mixture is then heated slowly to 60° C. and held at this temperature until a clear solution is obtained (approximately 40 minutes). The solution is neutralized with hydrochloric acid, cooled, and the polymer precipitated in the form of fine shreds by the slow addition with stirring of about 2 volumes of acetone. The precipitate is separated in a centrifuge, washed to remove salts and then dried. The final product, 699 parts, represents nearly a quantitative yield.

The process of this invention is applicable to the hydrolysis of any aqueous dispersion of a homopolymer of a vinyl ester of an organic acid having the general formula RCOOH, wherein R is of the group consisting of hydrogen atoms and hydrocarbon radicals, provided said acid is free from unsaturated linkages between acyclic carbon atoms and that any carbon atom alpha to the carbon atom in the carboxyl group of said acid is attached to at least one but not more than three carbon atoms, and to the hydrolysis of any aqueous dispersion of an interpolymer of a vinyl ester of said monocarboxylic acid with another polymerizable compound, free from salt-forming groups, which contains at least one ethylenic linkage, provided the mol ratio of vinyl ester to other monomers in said interpolymer is greater than 2/1. The solids content of the dispersion employed may be as high as is consistent with the mobility of the latex. Concentrations in excess of 60% are to be avoided since dispersions containing more than said percentage of homopolymer or interpolymer are usually thick pastes which are not adapted to hydrolysis according to the process of this invention. While concentrations of as high as 60% may be employed, optimum results are obtained when said dispersions contain from 15% to 35% solids by weight.

Inasmuch as the acid group of the vinyl ester is removed by hydrolysis, it is usually most economical to use a polymer or interpolymer of vinyl acetate, which is the most readily available vinyl ester. However, there may be employed in the process of this invention any vinyl ester of a monocarboxylic acid having the formula RCOOH wherein R is of the group consisting of hydrogen atoms and hydrocarbon radicals provided said acid is free from unsaturated linkages between acyclic carbon atoms and any carbon alpha to the carbon atom in the carboxyl group of said acid is attached to at least one but not more than three carbon atoms. Included among examples of said vinyl esters are: vinyl formate, vinyl acetate, vinyl benzoate, vinyl butyrate, vinyl stearate, vinyl propionate, vinyl cyclohexanoate, vinyl isobutyrate, vinyl palmitate, vinyl myristate, vinyl toluate, vinyl naphthylate, and the like. On account of the superior products had therewith, I prefer to employ a vinyl ester of an organic acid having the general formula $C_nH_{2n-1}COOH$, wherein $n$ is a positive integer within the range of from 1 to 6.

As hereinbefore stated, this invention is not restricted to the hydrolysis of homopolymers, i.e., of polymers in which the sole polymerizing constituent is one of the aforementioned vinyl esters. Interpolymers had by reacting a vinyl ester as hereinbefore defined with another polymerizable compound free from salt-forming groups which contains at least one ethylenic linkage, may also be hydrolyzed in accordance with the process of this invention. Examples of said interpolymers include interpolymers of a vinyl ester of a monocarboxylic acid having the formula RCOOH, wherein R is of the group consisting of hydrogen atoms and hydrocarbon radicals, said acid being free from unsaturated linkages between acyclic carbon atoms and any carbon atom alpha to the carbon atom in the carboxyl group of said acid being attached to at least one but not more than three carbon atoms, with vinyl fluoride, vinyl chloride, vinylidene chloride, trichloroethylene, styrene, camphene, isoprene, butadiene-1,3, and the like. While any polymerizable compound which is free from salt-forming groups and which contains at least one ethylenic linkage may be employed to form an interpolymer with a vinyl ester of a monocarboxylic acid as hereinbefore defined, optimum results are had when said other polymerizable compound is a monoolefine, e. g., ethylene, propylene, and isobutylene. The interpolymer best adapted for hydrolysis according to this invention is one of vinyl acetate with a monoolefine. In any event the mol ratio of vinyl ester to other polymerizable compound should be greater than 2/1.

Hydrolysis may be effected by any strong base, i. e., any alkaline-reacting compound which has a basic dissociation constant greater than $1 \times 10^{-5}$. Included among examples of said strong bases are: inorganic bases, e. g., sodium hydroxide, potassium hydroxide, ammonium hydroxide, calcium hydroxide, and trisodium phosphate; and organic bases, e. g., amines, such as dimethyl amine, methyl amine, trimethyl amine; guanidine; quaternary ammonium hydroxides, e. g., tetramethylammonium hydroxide; and the like. Of these, the alkali metal hydroxides, in particular, sodium hydroxide, are preferred on account of the superior results had therewith. The quantity of strong base employed is preferably equal to or slightly greater than the theoretical amount required. With too little alkali the reaction is slow and hydrolysis is apt to be incomplete, while with a large excess, especially if hydrolysis is carried out at high temperatures, the hydrolyzed product may be slightly discolored. The strong base may be mixed with the polymeric dispersion as a solution, or solid alkali may be added directly to the dispersion. In this latter case, it is preferable to use a flake caustic and extra good agitation.

The order of mixing the strong base with the dispersion is immaterial. However, inasmuch as the dispersion usually occupies a larger volume, it is simpler to add the strong base to the dispersion. In order to avoid agglomeration of the dispersion, it is essential that admixing of the dispersion and strong base should be effected at a temperature within the range of from 0° C. to 20° C. Hydrolysis of the polymeric material is thereafter effected by heating the mixture of dispersion and strong base. Said aqueous mixture may be heated to any temperature up to its normal boiling point and, if desired, higher temperatures can be used by employing a closed autoclave and operating under pressure. However, for most vinyl ester homopolymers and interpolymers, this is unnecessary since hydrolysis is effected very rapidly at moderate temperatures and, in fact, is usually complete before the temperature of a large kettle of the mixture can be raised from 10° C. to 70° C. The time required for the hydrolysis is dependent upon the temperature used and ranges from 35 to 40 hours at 20–25° C. to 5 min. or less at temperatures of 85–95° C. In any event, it is essential that heating should be continued until substantially complete hydrolysis of the ester groups of the vinyl ester homopolymer or interpolymer is effected. It is preferable to use the lowest temperature possible consistent with the desired rate of reaction since the higher temperatures tend to promote discoloration if a slight excess of alkali is present.

Although hydrolysis is, in general, more rapid and occurrence of unhydrolyzed particles more unlikely if conditions are chosen so that the hydrolysis product goes into solution, it is sometimes desirable to avoid the extra coagulation step which this entails. By the addition of inorganic salts such as sodium chloride, sodium carbonate, sodium sulfate, etc., to the aqueous hydrolysis mixture it is possible to suppress the solution of the hydrolyzed polymer without unduly affecting the hydrolysis rate. In such a procedure each small particle of vinyl ester homopolymer or vinyl ester interpolymer is maintained as a more or less distinct entity from the time the alkali is added until hydrolysis is complete and the hydrolysis product is ready to be filtered off, washed, and dried. Since there is never a polymer solution present, the viscosity of the mixture is fairly low and stirrer power requirements are correspondingly low.

The amount of salt required to suppress solution of the polymer varies from polymer to polymer and also from salt to salt. In general, unmodified polyvinyl alcohols require the highest concentration of salt, e. g., up to saturation, while interpolymers yielding hydrolyzed products which are normally less water sensitive than polyvinyl alcohol require smaller amounts. Sodium carbonate and sodium sulfate are more effective salting out agents than sodium chloride and are therefore required in smaller amounts. A salt concentration of 5–30% based on the water present in the mixture is the preferred range.

The hydrolysis reaction may be carried out in any corrosion resistant vessel but stainless steel and nickel are preferred materials of construction. Although glass-lined equipment is ordinarily not considered suitable for alkaline reactions, hydrolysis and precipitation of the polymers as described in the examples are carried out in such equipment without noticeably attacking the glass. This is probably due to the fact that hydrolysis has proceeded almost to completion with consequent neutralization of the alkali before the solution is hot enough to cause much etching of the glass. By mixing the cold polymer dispersion with a cold alkali solution and pumping the mixture through a long tube maintained at an elevated temperature, it is possible to carry out the hydrolysis as a continuous operation. The mixture is forced through the tube at such a rate that turbulent flow is obtained.

The hydrolyzed polymer may be isolated from solution by any suitable method such as dilution with a water-miscible non-solvent, addition of a salting out agent, spray drying, or by dialysis followed by drying. All but the last require that the isolated polymer be washed with water to remove inorganic salts and dispersing agent residues. Addition of non-solvents such as acetone, methanol, ethanol, dioxane, etc., or salting out agents such as sodium chloride, sodium sulfate, sodium carbonate, etc., are the most satisfactory methods for precipitation of the polymers. Addition of solid sodium chloride to saturate the hydrolysis mixture is the preferred procedure.

My hydrolyzing process possesses advantages not previously combined in a single process. Furthermore, the products of my process possess advantages not previously combined in a hydrolyzed polymeric material. For example, the hereinbefore defined vinyl ester homopolymers and interpolymers can be hydrolyzed cheaply and in a practical manner according to the process hereinbefore set out. Furthermore, when said process is employed, said hydrolyzed products are obtained directly, without isolation of the polymer, from the dispersions of said vinyl ester homopolymers and interpolymers had according to prior art emulsion polymerization processes.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. The process for obtaining a substantially completely hydrolyzed interpolymer of vinyl acetate with ethylene, which comprises cooling to a temperature within the range of from 5° C. to 10° C., an aqueous dispersion containing from 15% to 30% by weight of an interpolymer of vinyl acetate with ethylene, the mol ratio of vinyl acetate to ethylene in said interpolymer being at least 2/1, mixing a methanol-water solution of the theoretically required quantity of sodium hydroxide therewith at a temperature within the range of from 5° C. to 10° C. and heating the resultant mixture to a temperature within the range of from 80° C. to 85° C. until a clear solution is obtained, neutralizing said solution, filtering the same, and precipitating the resultant hydrolyzed interpolymer by slow addition with stirring of enough sodium chloride to saturate the solution, filtering off the product, washing the same with water until it is free from salts, and drying the same.

2. The process of hydrolyzing an interpolymer of vinyl acetate with a monoolefine, said monoolefine containing not more than four carbon atoms and the mol ratio of vinyl acetate to monoolefine in said interpolymer being at least 2/1, which comprises adding a strong base to an aqueous dispersion of said interpolymer containing from 15% to 35% solids by weight, said base being added in amount substantially equal to that theoretically required to react with the acetate groups of said interpolymer and addition of said base to said interpolymer being effected at a temperature within the range of from 5° C. to 10° C., and therefater heating the resultant mixture to a temperature of not more than 100° C. until hydrolysis of the acetate groups of said interpolymer is substantially complete.

3. A process of hydrolyzing a polymer of a vinyl ester of an alkanoic acid of the formula $C_nH_{2n-1}COOH$ where $n$ is 1 to 6 inclusive which comprises adding a strong base to an aqueous dispersion of said polymer containing from 15% to 35% solids by weight, said base being added in amount substantially equal to that theoretically required to react with the ester groups of the said polymer and addition of said base to said polymer being effected at a temperature within the range of from 5° C. to 10° C., and thereafter heating the resultant mixture to a temperature of not more than 100° C. until the hydrolysis of the ester groups of the said interpolymer is substantially complete.

4. A process of hydrolyzing polyvinyl acetate which comprises adding a strong base to an aqueous dispersion of the said polyvinyl acetate containing from 15% to 35% solids by weight, said base being added in amount substantially equal to that theoretically required to react with the ester groups of the said polyvinyl acetate and addition of said base to said polyvinyl acetate dispersion being effected at a temperature within the range of 5° C. to 10° C., and thereafter heating the resultant mixture to a temperature of not more than 100° C. until the hydrolysis of the ester groups of the said polyvinyl acetate is substantially complete.

LOUIS PLAMBECK, Jr.

REFERENCES CITED

The following references are of record in the file of this patent:

UNITED STATES PATENTS

| Number | Name | Date |
|---|---|---|
| 1,897,856 | Noller | Feb. 14, 1933 |

OTHER REFERENCES

Hermann, Berichte, vol. 60, pp. 1658–1663 (1927).